(12) United States Patent
Wahl

(10) Patent No.: US 6,373,885 B1
(45) Date of Patent: Apr. 16, 2002

(54) CIRCUIT AND METHOD FOR DETECTING AN ESCAPE SEQUENCE

(75) Inventor: Steven R. Wahl, Chanhassen, MN (US)

(73) Assignee: Digi International, Inc., Minnetonka, MN (US)

( * ) Notice: Subject to any disclaimer, the term of this patent is extended or adjusted under 35 U.S.C. 154(b) by 0 days.

(21) Appl. No.: 09/192,114

(22) Filed: Nov. 13, 1998

(51) Int. Cl.[7] ............................. H04B 1/38; H04L 5/16
(52) U.S. Cl. ..................................... 375/222; 708/212
(58) Field of Search ........................... 375/222, 220, 375/219; 708/212; 379/93.28, 93.31

(56) References Cited

U.S. PATENT DOCUMENTS

| | | | |
|---|---|---|---|
| 4,549,302 A | | 10/1985 | Heatherington ................ 375/8 |
| 4,926,448 A | * | 5/1990 | Kraul et al. ................. 375/377 |
| 4,928,305 A | * | 5/1990 | Yui ........................... 379/93.28 |
| 5,107,518 A | * | 4/1992 | Petty, Jr. ...................... 375/222 |
| 5,245,560 A | | 9/1993 | Cunningham et al. . 364/715.11 |
| 5,295,156 A | * | 3/1994 | Heep et al. ................... 375/222 |
| 5,359,648 A | * | 10/1994 | Dunn et al. ................. 379/93.31 |
| H1413 H | * | 2/1995 | Gunn .......................... 375/222 |
| 5,528,626 A | * | 6/1996 | Brigida et al. .............. 375/222 |
| 5,530,718 A | | 6/1996 | Gradeler et al. ............. 375/222 |
| 6,151,355 A | * | 11/2000 | Vallee et al. ................. 375/220 |

* cited by examiner

Primary Examiner—Chi Pham
Assistant Examiner—Phuong Phu
(74) Attorney, Agent, or Firm—Schwegman, Lundberg, Woessner & Kluth, P.A.

(57) ABSTRACT

A method for selecting the operational mode of a modem is provided. The method determines the number of characters in a data packet directed to a modem when the modem is not in time independent escape sequence (TIES) mode of operation. The method bypasses the TIES mode of operation when a data packet contains more than X characters.

33 Claims, 2 Drawing Sheets

US 6,373,885 B1

CIRCUIT AND METHOD FOR DETECTING AN ESCAPE SEQUENCE

TECHNICAL FIELD OF THE INVENTION

The present invention relates generally to the field of communications and, in particular, to a circuit and method for detecting an escape sequence.

BACKGROUND

In recent years, computers have become a commonplace part of life for large segments of society. Many businesses and other groups or institutions rely on vast networks of computers to share data among geographically dispersed users. To communicate with each other, these computers often include devices known as modems that allow computers to communicate with each other.

One type of modem is known colloquially as a "Hayes compatible" modem. This type of modem operates generally in one of two modes: a transparent or online mode and a command mode. In the command mode, data that is provided to the modem is interpreted as commands for the modem. In the transparent mode, the data received at an input to the modem is communicated out an output port and sent over a communication link to another modem. One problem in the design of these modems is how to instruct the modem when to switch from transparent mode to the command mode of operation.

U.S. Pat. No. 4,549,302 (the '302 Patent) refers to the use of an escape sequence to return from online mode to command mode. The escape sequence includes an escape command that is preceded by a period of silence, e.g., 1 second, and/or followed by a period of silence. The periods of silence in the escape sequence are used to prevent the modem from inadvertently entering into the command mode of operation. To detect this escape sequence, the modem includes a timer. The timer measures periods of silence in the data stream.

In an alternative to the technique of the '302 Patent, a time independent escape sequence (TIES) detection process has been developed. According to the TIES process, all characters received by the modem are monitored to detect receipt of the escape command. When a possible escape command is detected, the TIES process determines the escape command is followed by a valid command from the modem command set. If not, it is assumed that the characters are not part of an escape sequence and the modem stays in the online mode. If the escape command is followed by a valid command, then the modem switches to command mode.

One problem with the TIES detection process is that it is necessary to constantly monitor the data provided to the modem for the escape command. This requires a large amount of overhead processing.

For the reasons stated above, and for other reasons stated below which will become apparent to those skilled in the art upon reading and understanding the present specification, there is a need in the art for an improved circuit and method for controlling the operational mode of a modem.

SUMMARY OF THE INVENTION

The above mentioned problems with modems and other problems are addressed by the present invention and which will be understood by reading and studying the following specification. A circuit and method for detecting an escape sequence is described which uses the size of a data packet to determine when to send data to the TIES detection process thereby reducing the amount of data that is monitored by the TIES process. The TEES process is used only when the data in a message is small, e.g., three or fewer characters. Otherwise, the data received by the modem is sent directly out in the online mode of operation.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
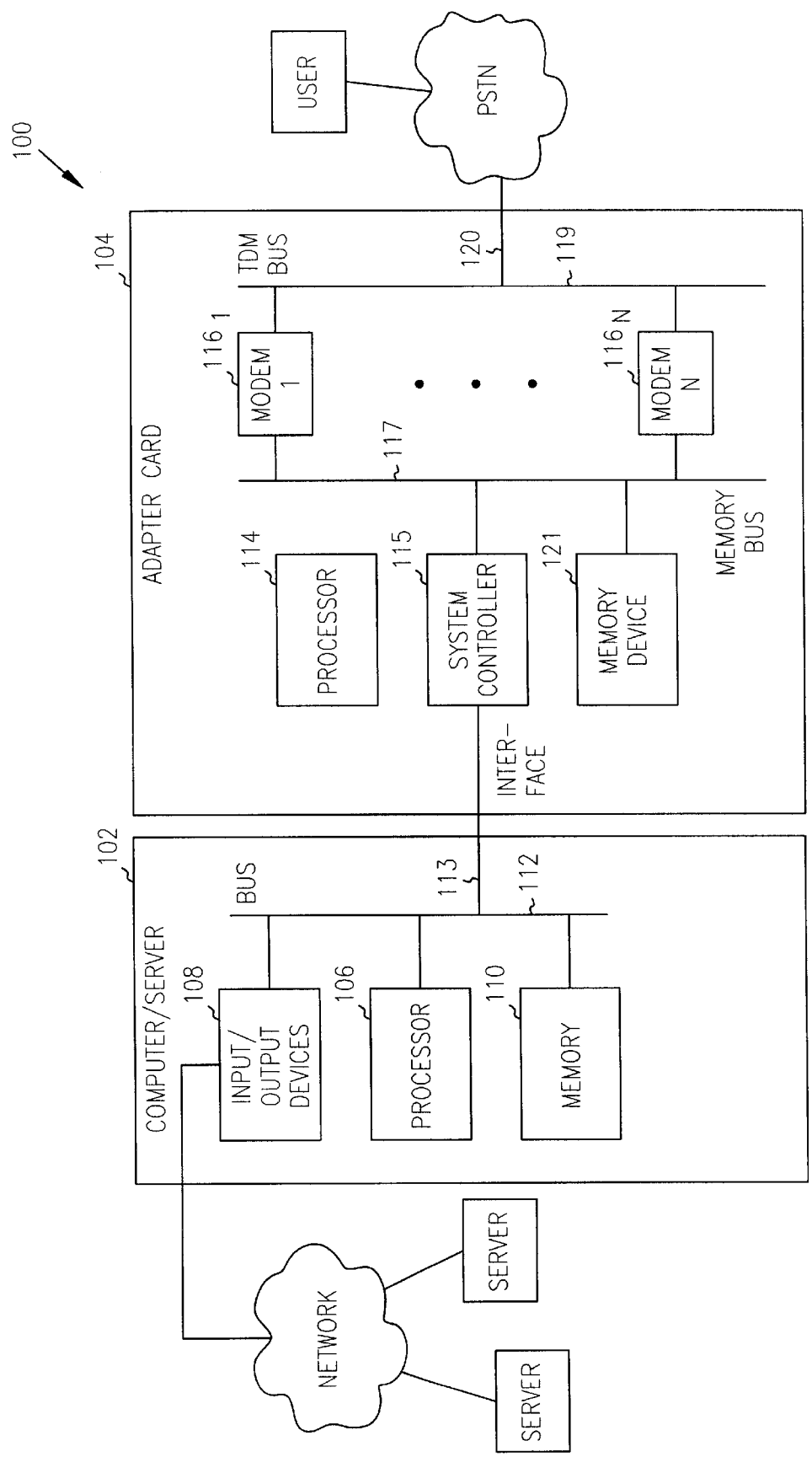
FIG. 1 is a system block diagram of an illustrative embodiment of the present invention.

FIG. 1 is a block diagram of an illustrative embodiment of the present invention. System 100 includes computer 102 that is coupled to adaptor card 104. Adaptor card 104 provides a number of modem ports for system 100 so as to allow system 100 to function as a Remote Access Server (RAS). Adaptor card 104 resides in an interface slot on the main or mother board of computer 102. Computer 102 comprises, for example, a microprocessor-based computer or server. Computer 102 includes processor 106, input/output devices 108, and memory 110 that are interconnected on the main board by bus 112. Input/output devices 108 include, for example, network connections, communications ports, and other conventional devices for connecting with external systems and networks.

Processor 106 is communicatively coupled to processor 114 of adaptor card 104 through interface 113 and system controller 115. Processor 114 communicates with modems $161_1, \ldots 116_N$, over bus 117. Among other responsibilities, processor 114 monitors messages from an application program running on processor 106. These messages pass data to modems or ports $116_1$ through $116_n$ of adaptor card 104. Further, processor 106 uses these messages to control the mode of operation of each of the modems, e.g., the message are used to change a modem from online to command mode of operation. The messages from processor 106 include, for example, a header and data. The header includes information such as the channel, port number or modem number of adaptor card 104 that is to receive the data in the message. Additionally, since the application program acts as a buffer, the message includes a field that indicates the length of the data in the message.

Modems $116_1, \ldots 116_N$ communicate with, for example, the public switched telephone network (PSTN) over communication link 120, e.g., T1, E1 or other appropriate communication link. Adaptor card 104 includes a time division multiplexing (TDM) bus 119 that couples modems $116_1, \ldots, 116_N$ with communication link 120.

In operation, processor 114 looks at the amount of data that is contained in a message from processor 106, e.g., using the length field, to determine whether the modem designated in the message is to change from online mode to command mode of operation. The processor can make this determination since, when an escape command is given to a Hayes compatible modem, the application program will cause the command, i.e., the data, to be preceded and/or followed by a period of silence. Thus, a message that carries an escape command will include, at most the characters of the escape command. Conventionally, this is three "+" characters. Processor 114 looks for messages with data of three characters or less and, then passes the data through a TIES detection process to determine if a valid escape command has been received.

For example, when the application on computer 102 needs modem $116_1$ to enter command mode, processor first polls modem $116_1$ through processor 114 to determine whether the queue for modem $116_1$ is empty. Next, processor 106 sets a timer of a specified duration, e.g., 1 second. Once the timer expires, processor 106 sends a message to processor 114 that contains all or part of the escape command. Once the queue for modem $116_1$ is empty again, processor 106 sets another timer and waits to send additional messages for modem $116_1$ until expiration of the timer. This is known as an escape sequence. It is noted that processor 114 of adaptor card 104 does not set any timers in this process. When processor 114 receives the message with all or part of the escape command, processor 114 initiates the TIES detection process if the characters match at least a part of the escape command or its prefix. Advantageously, this allows processor 114 to pass most messages directly to the modems without requiring the processor to look at all of the characters in each message as would be done in normal TIES detection operation.

Figure 2:
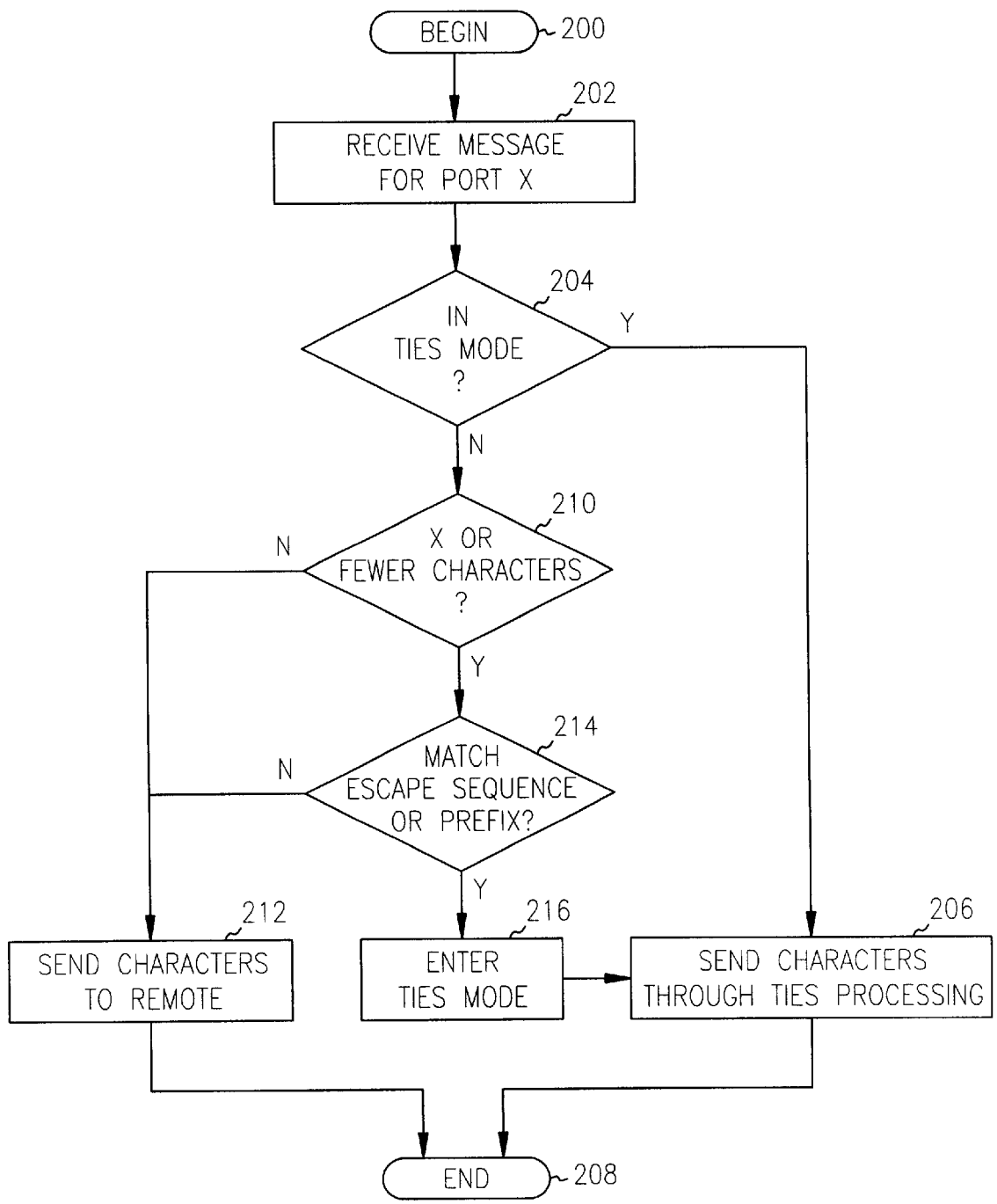
FIG. 2 is a flow chart of an illustrative embodiment of the present invention.

FIG. 2 is a flow chart of an illustrative embodiment of the present invention. This method is used on top of a time independent escape sequence (TIES) detection process to determine when to switch a modem from an online or transparent mode of operation to a command mode of operation. Essentially, this embodiment uses the size of a data packet to determine when to send data to the TIES detection process thereby reducing the amount of data that is monitored by the TIES process. As described above, the TIES process examines each character in a data stream to determine whether the escape command is present. Thus, to improve on the TIES process, the method passes the packets on to the TIES process only if the packets are sufficiently small. For larger packets, the data is routed directly to the modem, bypassing the TIES process, and transmitted out onto the communication link.

The method begins at block 200. At block 202, the method receives a message that is directed to a modem or port. This message contains, for example, data for the port and a header. The header includes, among other information, the port identification and the length of the data in the message. Advantageously, this embodiment uses the length of the data in the message to determine whether to check for an escape command using the TIES detection process.

At block 204, the method determines whether the port is currently using the TIES detection process. If so, the method proceeds to block 206 and passes the data through the TIES detection process. The method ends at block 208.

If at block 204 the modem is not currently using the TIES detection process, the method proceeds to block 210 and examines the quantity of the data in the message. If there are more than X characters, e.g., more than three characters, the method proceeds to block 212 and the modem sends the characters directly over the communication link to a remote modem. The method ends at block 208.

If at block 210 the method determines that there are X or fewer characters, the method proceeds to block 214 to analyze the content of the data. Advantageously, this ability to ignore data in messages with greater than X characters makes it possible for a single processor to handle determinations regarding mode of operation for a number of modems. At block 214, the method determines whether the characters match the escape sequence, e.g., "+++" or other user settable escape sequence, or prefix. If not, the method proceeds to block 212 and processes the data as described above. If the method identifies a match, the method enters TIES mode at block 216 and proceeds to process the data at block 206 as described above.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, when a packet is determined to contain at least a portion of the designated escape sequence, the method can initiate any appropriate procedure for determining whether the characters represent a valid escape sequence including procedures other than the conventional TIES detection process. Further, the method can be used with a single modem as well as with a larger number of modems that share a processor. Further, the escape sequence that can be detected is not limited to a three character command that is preceded and followed by a second of silence. Other escape sequences that produce small data packets can be used.

What is claimed is:

1. A method for controlling the operation of a modem, the method comprising:

receiving a message containing data directed to the modem;

examining the quantity of data associated with the message;

when the data has more than X characters, passing the data directly through to the modem in an online mode of operation;

when the data has X or fewer characters, comparing the characters with a designated escape command and prefix; and when the characters match the escape command or prefix, routing the data of the message through a time independent escape sequence detection process to determine whether to enter a command mode of operation.

2. A The method of claim 1, wherein examining the quantity of data comprises determining whether the data has three or fewer characters.

3. The method of claim 1, wherein comparing the characters with the designated escape command and prefix comprises determining whether the data contains one or more "+" characters.

4. The method of claim 1, and further comprising after receiving the message:

determining whether the modem is in the time independent escape sequence mode of operation; and when in the time independent escape sequence mode of operation, routing the data from the message to the time independent escape sequence detection process without further processing of the message.

5. A method for controlling the operation of a number of modems on an adaptor card that communicates with an application program of a host system, the method comprising:

receiving a message for one of the modems, the message including data and a header containing the length of the data;

reading the length of the data from the message header;

when the data has more than three characters, passing the data directly through to the modem in an online mode of operation;

when the data has three or fewer characters, comparing the characters with the designated escape command and prefix; and when the characters match the escape command or prefix, routing the data of the message through a time independent escape sequence detection process to determine whether to enter a command mode of operation.

6. The method of claim 5, wherein comparing the characters with the designated escape command and prefix comprises determining whether the data contains one or more of the designated character.

7. The method of claim 5, wherein comparing the characters with the designated escape command and prefix comprises determining whether the data contains one or more "+" characters.

8. The method of claim 5, and further comprising after receiving the message:

determining whether the modem is in the time independent escape sequence mode of operation; and when in the time independent escape sequence mode of operation, routing the data from the message to the time independent escape sequence detection process without further processing of the message.

9. A method for selecting the operational mode of a modem, the method comprising:

determining the number of characters in a data packet directed to a modem when the modem is not in time independent escape sequence (TIES) mode of operation;

bypassing the TIES mode of operation when a data packet contains more than X characters.

10. The method of claim 9, and further comprising bypassing the TIES mode of operation when a data packet of X or fewer characters does not match an escape command or a prefix of an escape sequence.

11. The method of claim 9, and further comprising entering TEES mode of operation only when a packet has X or fewer characters and the characters match either the escape command or a portion thereof.

12. The method of claim 9, wherein bypassing the TIES mode of operation comprises bypassing the TIES mode of operation when a data packet contains more than three characters.

13. A method for selecting the operational mode of a modem, the method comprising:

determining the number of characters in a data packet directed to a modem when the modem is not in time independent escape sequence (TIES) mode of operation, wherein determining the number of characters comprises reading a length value in a header of a message to the modem; and bypassing the TIES mode of operation when a data packet contains more than X characters.

14. An adaptor card comprising:

an interface that receives messages from a host computer;

at least one modem that include a port for transmitting data from the messages over a communications link;

wherein the at least one modem transmits data in either an online mode or a command mode of operation; and a processor, communicatively coupled to the interface, that determines the number of characters of data in a message directed to the at least one modem and that bypasses a time independent escape sequence (TIES) detection process when the data contains more than X characters.

15. The adaptor card of claim 14, wherein the interface comprises an interface for coupling to an expansion slot of a main board of a computer system.

16. The adaptor card of claim 14, wherein the processor determines whether the message contains three or more characters.

17. The adaptor card of claim 14, wherein the processor determines whether the characters match all or a portion of an escape command when the length of the data is three characters or less.

18. A remote access system, comprising:

a processor based computer that is coupled to a network; and an adaptor card including:

an interface that receives messages from a host computer;

at least one modem that include a port for transmitting data from the messages over a communications link;

wherein the at least one modem transmits data in either an online mode or a command mode of operation; and a processor, communicatively coupled to the interface, that determines the number of characters of data in a message directed to the at least one modem and that bypasses a time independent escape sequence (TIES) detection process when the data contains more than X characters.

19. The system of claim 18, wherein the interface comprises an interface for coupling to an expansion slot of a main board of a computer system.

20. The system of claim 18, wherein the processor determines whether the message contains three or more characters.

21. The system of claim 18, wherein the processor determines whether the characters match all or a portion of an escape command when the length of the data is three characters or less.

22. A method for controlling the operation of a modem, the method comprising:

receiving a message containing data directed to the modem, wherein receiving a message comprises receiving a message with data and a header containing the length of the data;

examining the quantity of data associated with the message;

when the data has more than X characters, passing the data directly through to the modem in an online mode of operation;

when the data has X or fewer characters, comparing the characters with a designated escape command and prefix; and when the characters match the escape command or prefix, routing the data of the message through a time independent escape sequence detection process to determine whether to enter a command mode of operation.

23. The method of claim 22, wherein examining the quantity of data comprises reading the length of the data from the header.

24. An adaptor card comprising:

an interface that receives messages from a host computer;

at least one modem that include a port for transmitting data from the messages over a communications link;

wherein the at least one modem transmits data in either an online mode or a command mode of operation; and a processor, communicatively coupled to the interface, that determines the number of characters of data in a message directed to the at least one modem and that bypasses a time independent escape sequence (TIES) detection process when the data contains more than X characters, wherein the processor reads a length value from a header of the message.

25. A remote access system, comprising:

a processor based computer that is coupled to a network; and an adaptor card including:
 an interface that receives messages from a host computer;
 at least one modem that include a port for transmitting data from the messages over a communications link;
 wherein the at least one modem transmits data in either an online mode or a command mode of operation; and
 a processor, communicatively coupled to the interface, that determines the number of characters of data in a message directed to the at least one modem and that bypasses a time independent escape sequence (TIES) detection process when the data contains more than X characters, wherein the processor reads a length value from a header of the message.

26. A method for bypassing a time independent escape sequence (TIES) when a modem is in an on-line mode of operation, comprising:

receiving a message that contains a number of characters;

determining whether the number of characters is more than X; and upon determining that the number of characters is more than X, sending the message to the modem.

27. The method of claim 26, further comprising performing a time independent escape sequence (TIES) detection process on the message upon determining that the number of characters is not more than X.

28. The method of claim 27, wherein performing a time independent escape sequence (TIES) detection process on the message includes determining whether the characters match a designated escape sequence.

29. The method of claim 26, wherein determining whether the number of characters is more than X includes using a data length field from a message header.

30. An adapter card, comprising:

a modem having an on-line mode of operation and a command mode of operation; and circuitry coupled to the modem, wherein the circuitry is adapted to:
 receive a message that contains a number of characters,
 determine whether the number of characters is more than X while the modem is in the on-line mode of operation, and send the message to the modem upon determining that the number of characters is more than X.

31. The adapter card of claim 30, wherein the circuitry includes a processor adapted to monitor the message and determine the mode of operation of the modem.

32. The adapter card of claim 31, wherein the processor is adapted to use a data length field from a message header.

33. The adapter card of claim 30, wherein the circuitry is farther adapted to perform a time independent escape sequence (TIES) detection process on the message upon determining that the number of characters is not more than X.

* * * * *

UNITED STATES PATENT AND TRADEMARK OFFICE
CERTIFICATE OF CORRECTION

PATENT NO. : 6,373,885 B1 Page 1 of 1
DATED : April 16, 2002
INVENTOR(S) : Steven R. Wahl It is certified that error appears in the above-identified patent and that said Letters Patent is hereby corrected as shown below:

Column 2,
Line 2, delete "TEES" and insert -- TIES --, therefor.
Line 44, delete "161" and insert -- 116 --, therefor.

Column 4,
Line 49, delete "A" before "The", therefor.

Column 5,
Line 45, delete "TEES" and insert -- TIES --, therefor.

Signed and Sealed this

Sixteenth Day of July, 2002

*Attest:*

*Attesting Officer*

JAMES E. ROGAN
*Director of the United States Patent and Trademark Office*